(12) United States Patent
Kobori

(10) Patent No.: US 7,016,271 B2
(45) Date of Patent: Mar. 21, 2006

(54) OPTICAL RECORDING/PLAYBACK APPARATUS AND OPTICAL RECORDING MEDIUM

(75) Inventor: Hiromichi Kobori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 591 days.

(21) Appl. No.: 10/252,611

(22) Filed: Sep. 24, 2002

(65) Prior Publication Data

US 2003/0058756 A1    Mar. 27, 2003

(30) Foreign Application Priority Data

Sep. 26, 2001   (JP) .............................. 2001-293626

(51) Int. Cl.
    *G11B 7/00*   (2006.01)
(52) U.S. Cl. ................................. 369/44.26; 369/44.37
(58) Field of Classification Search ............. 369/44.26, 369/44.37, 44.32, 112.1, 44.27, 44.28, 44.25, 369/112.01, 44.41, 44.29
See application file for complete search history.

(56) References Cited

U.S. PATENT DOCUMENTS

| 5,210,730 A | * | 5/1993 | Hayashi et al. ........... 369/44.37 |
| 5,708,636 A | * | 1/1998 | Takahashi et al. ........ 369/44.41 |
| 5,815,473 A | * | 9/1998 | Takahashi et al. ........ 369/44.26 |
| 5,936,920 A | * | 8/1999 | Noda ........................ 369/44.37 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical recording/reproducing apparatus comprises a light beam emitting unit which emits a plurality of light beams to the recording medium, a photodetection unit which detects the reflected light beams and output detection signals, a detection signal selection unit which selects one of the detection signals according to one of a plurality of tracks which is selected in order to record or reproduce data, the tracks being formed on at least one of the land and the groove, and a tracking control unit which make one of the light beams trace the track which is selected in order to record or reproduce data, according to the selected detection signal.

10 Claims, 5 Drawing Sheets

OPTICAL RECORDING/PLAYBACK APPARATUS AND OPTICAL RECORDING MEDIUM

CROSS-REFERENCE TO RELATED APPLICATIONS

This application is based upon and claims the benefit of priority from the prior Japanese Patent Application No. 2001-293626, filed Sep. 26, 2001, the entire contents of which are incorporated herein by reference.

BACKGROUND OF THE INVENTION

1. Field of the Invention

The present invention relates to an optical recording and reproducing apparatus which records data on a recording medium and reproduces recorded data by means of a laser.

2. Description of the Related Art

In recent years, high density of optical disc progresses by short-wavelength of light source and high NA (Numerical Aperture) of objective lens. If recording density will be raised more in future, high line-density and high track-density become important. A PRML (Partial Response Maximum Likelihood) signal processing technique or super-resolution technique is effective for high line-density. Further, the superresolution technique is promising in high track-density.

The conventional technique makes one data track correspond to one groove or one land. Further, generation of a tracking error signal and data recording and reproducing are performed based on a push-pull method of detecting imbalance of diffraction light from a groove or land by means of a single light beam. For this reason, there is a problem that the amplitude of the tracking error signal is greatly deteriorated with narrowing of the tracks. As a result, stable tracking control cannot be realized.

It is an object of the present invention to provide an optical data recording and reproducing apparatus which realizes stable tracking control for an optical data recording medium of high track density, for example, an optical disc which narrows a track pitch more than the conventional disc.

BRIEF SUMMARY OF THE INVENTION

According to an aspect of the present invention, there is provided an optical data recording/reproducing apparatus using a recording medium having at least one of a land and a groove, the optical data recording/reproducing apparatus comprising: a light beam emitting unit configured to emit a plurality of light beams to the recording medium, the at least one of the land and groove containing a plurality of tracks corresponding to the light beams; a photodetection unit configured to detect the light beams reflected from the recording medium and output detection signals corresponding to the reflected light beams; a detection signal selection unit configured to select at least one of the detection signals detected by the photodetection unit according to one of a plurality of tracks which is selected in order to record or reproduce data, the tracks being formed on at least one of the land and the groove, and a tracking control unit configured to make one of the light beams trace the track which is selected in order to record or reproduce data, according to the selected detection signal.

According to another aspect of the invention, there is provided an optical recording/reproducing method comprising: emitting a plurality of light beams to a recording medium; detecting the light beams reflected from the recording medium by a photodetector to output detection signals; selecting at least one detection signal of the detection signals detected by the photodetector, according to one of a plurality of tracks which is selected in order to record or reproduce data, the tracks being formed on at least one of the land and the groove; and tracking the track which is selected in order to record or reproduce data by means of one of the light beams, according to the detection signal selected.

DETAILED DESCRIPTION OF THE INVENTION

There will now be described embodiments of the present invention in conjunction with drawings.

The present invention can apply to a groove recording scheme, a land recording scheme, or a land & groove recording scheme. The first embodiment describes an optical recording and reproducing of the land & groove scheme.

Figure 1A:
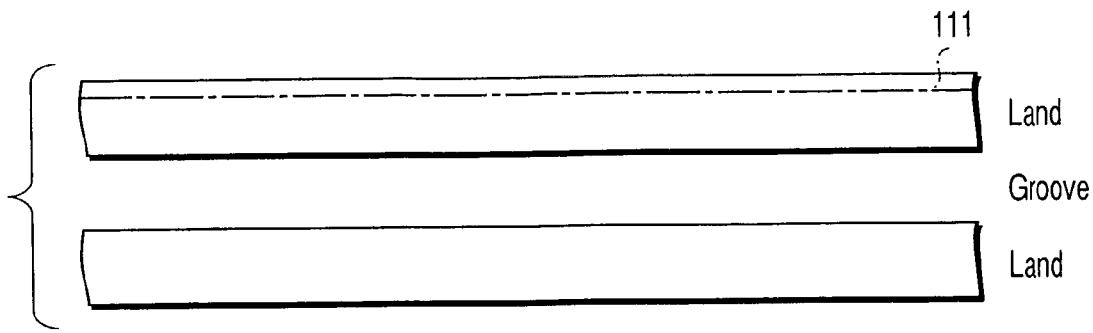
FIGS. 1A to 1D show states forming three tracks on a land and a groove by means of an optical recording and reproducing apparatus according to an embodiment of the present invention.
Figure 1B:
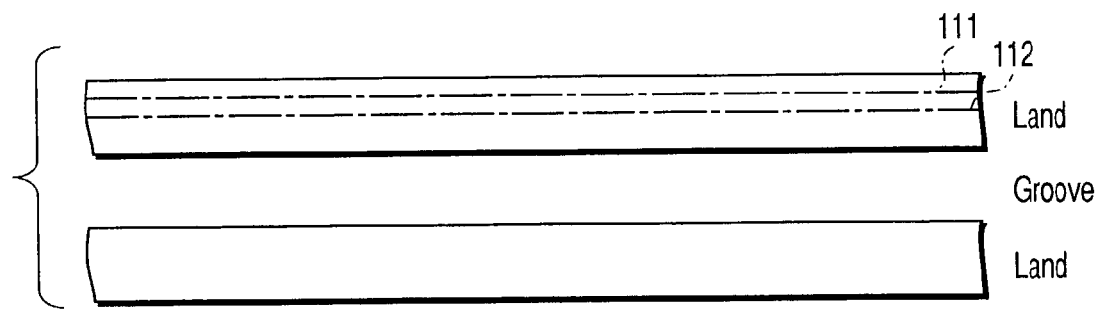
Figure 1C:
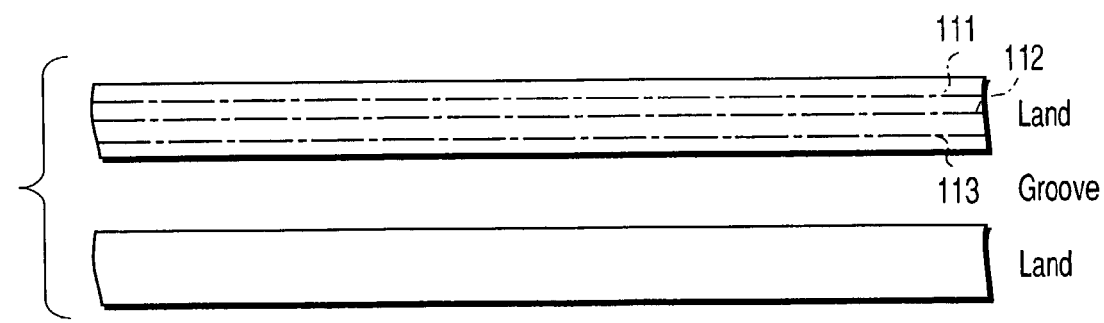
Figure 1D:
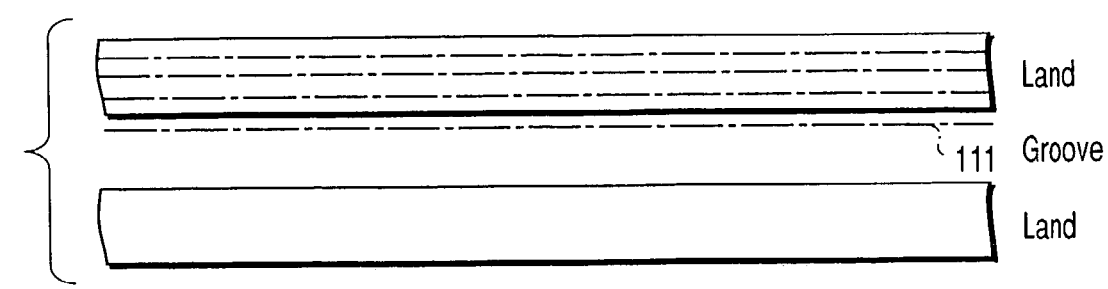

FIGS. 1A to 1D show states forming three data tracks on a land and a groove of an optical disc. In other words, FIG. 1A shows a state forming a first track 111 on the circumference side of the land, FIG. 1B shows a state forming a second track 112 on the center of the land, FIG. 1C shows a state forming a third track 113 on the internal circumference side of the land, and FIG. 1D shows a state forming a first track 111 on the circumference side of the groove. These tracks are formed in turn on the land and groove in units of one circuit of the optical disc.

Figures 2A, 2B, 2C:
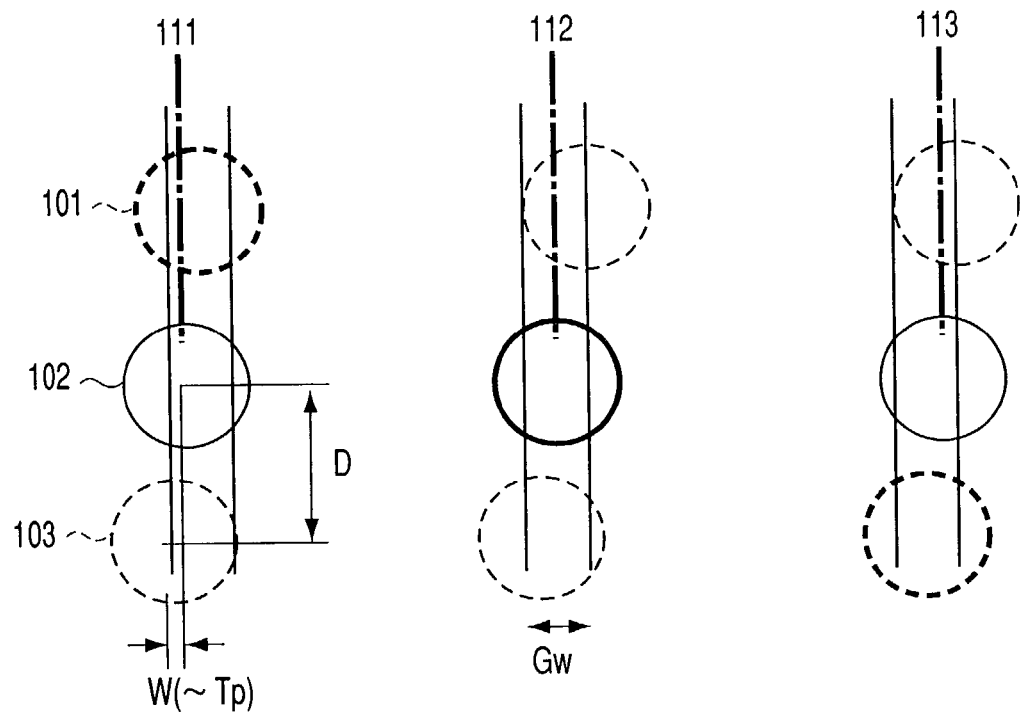
FIGS. 2A, 2B and 2C show positional relations between three tracks provided in a groove or a land and a focused beam.

FIGS. 2A, 2B and 2C show relative positional relations between the recording/reproducing of each track and three focused beams, in a case of arranging three tracks on the land or groove of the optical disc. In other words, FIG. 2A shows a case that performs data recording or data reproducing for the track 111 on the left side. (the circumference side) of the groove, FIG. 2B shows a case that performs data recording or data reproducing for the track 112 on the center of the groove, and FIG. 2C shows a case that performs data recording or data reproducing for the track 113 on the right side (the inner circumference side) of the groove.

Three light beams 101, 102, and 103 focused on the groove are generated through a diffraction grating, for example, the ratio of the optical intensities of the light beams 101 and 103 of each side that are shown by dashed lines (tracking controlling light beam) to a light intensity of the central light beam (light beam for exposure) 102 that is shown by a solid line is set at 1:10, and the recording and reproducing of data are performed by the central light beam 102 of the large light intensity.

The light intensity ratio between the light beams is set usually at the above value. As a result, it can be avoided that the recorded data of adjacent tracks are erased by mistake by the side light beams 101 and 103 in a recording operation. Further, the beam diameter $\Phi$ becoming $1/e^2$ of the center strength of each focused beam has a relation of Gw to $2\Phi/3$ with respect to a groove width Gw. For this reason, the amplitude of the tracking error signal is large, and a good tracking error signal can be obtained. As a result, stable tracking control can be realized.

The distance W between the center positions of three light beams 101, 102 and 103 in a direction perpendicular to the track approximately coincides with the track pitch Tp between adjacent tracks 111 and 112 and between the tracks 112 and 113. In other words, the center positions of three light beams 101, 102 and 103 shift in turn by the track pitch Tp in a radial direction of the optical disc. The distance D between the center positions of three light beams 101, 102 and 103 with respect to a direction along the data track is set to be $D \geq 2\Phi$ with respect to the focal beam diameter $\Phi$.

When the recording and reproducing for the track 111 are done by three light beams as above described, the tracking control are done using the light beam 101 shown by the thick dashed line in FIG. 2A, and the recording and reproducing are performed by the central light beam 102. When data is recorded on or reproduced from the track 112 as shown in FIG. 2B, tracking control and data recording and reproducing is done using the central light beam 102 shown by a thick solid line. The light intensity of the central light beam 102 is changed between the tracking control and the recording/reproducing. When data is recorded on or reproduced from the track 113 as shown in FIG. 2C, the tracking control is done using the light beam 103 shown by the thick dashed line in FIG. 2C, and the recording and reproducing are performed by the central light beam 102. In other words, when the center position of the light beam 101 is at the center position of the land or groove, the light beam 101 is used as a tracking control beam, and data is recorded on or reproduced from the track 111 by the light beam 102. When the center position of the light beam 102 is at the center position of the land or groove, the light beam 102 is used as a tracking control beam and a data recording and reproducing beam and records data on or reproduces data from the center track 112. When the center position of the light beam 103 is at the center position of the land or groove, the light beam 103 is used as a tracking control beam, and the light beam 102 records data on or reproduces data from the track 113. In this way, three tracks are formed on each land and each groove, and data recording and reproducing are performed.

By changing three kinds of light beams generate tracking error signals as described above, a conventional tracking control driver can be used. In addition, the focusing error signal may use the light beam for the tracking control or the central light beam in case of all of FIGS. 2A, 2B, and 2C.

Figure 3:
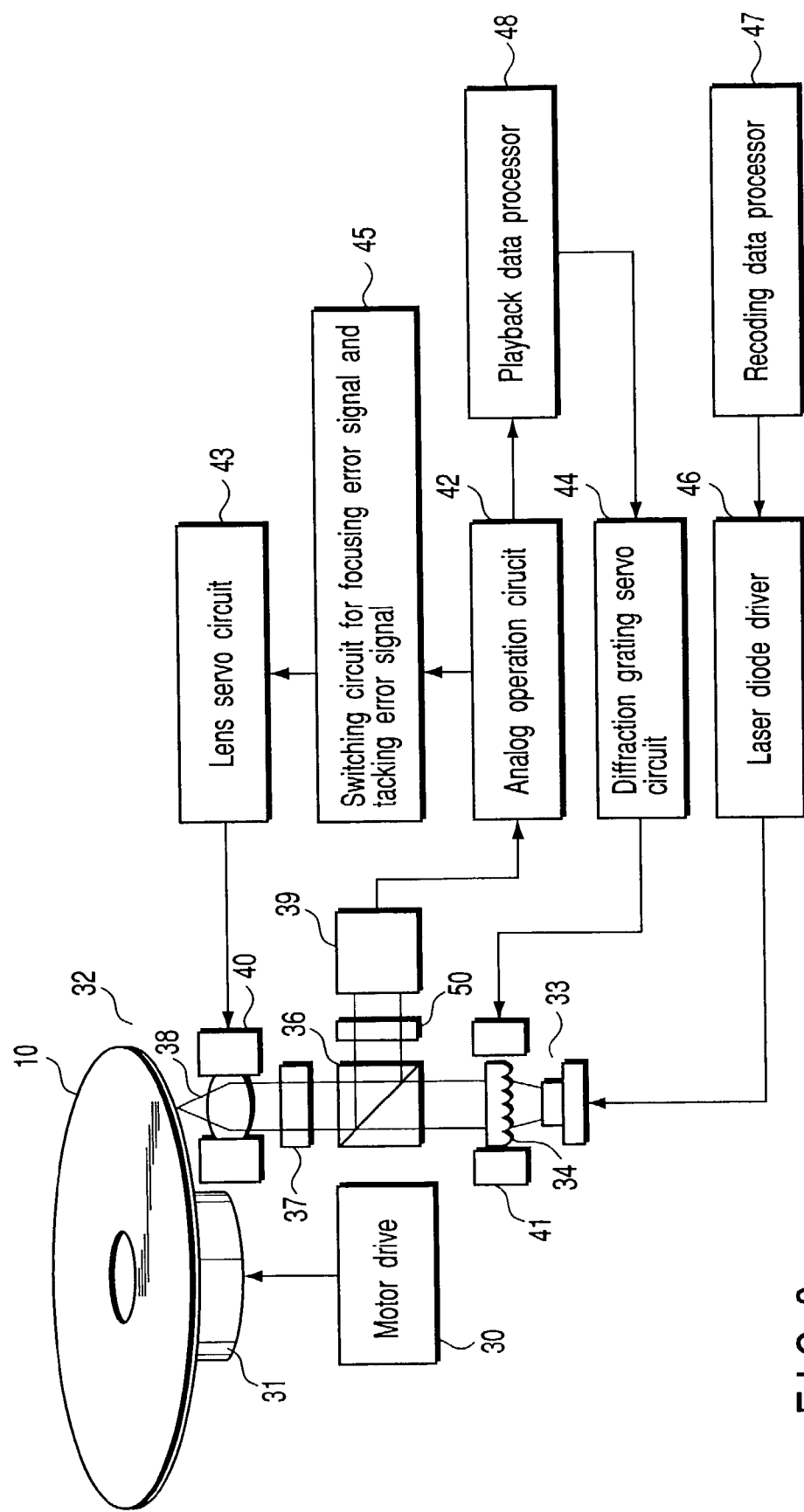
FIG. 3 shows a schematic configuration of the optical recording and reproducing apparatus according to the embodiment of the present invention.
Figure 5:
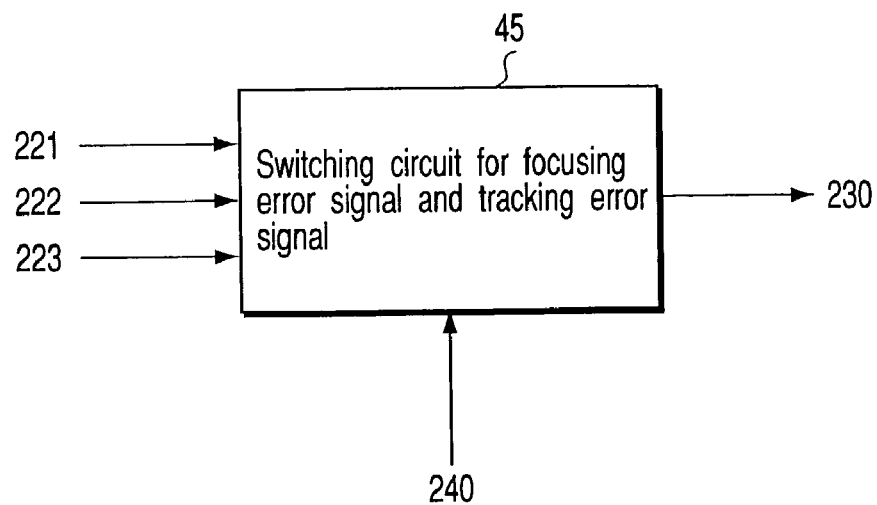
FIG. 5 shows a circuit block of a switching device configured to switch between a focal error signal and a tracking error signal.

FIG. 3 shows a schematic configuration of an optical data recording/reproducing apparatus according to the first embodiment of the present invention. In FIG. 3, a spindle motor 31 driven by a motor driver 3 rotates the optical disc 1. An optical head 32 facing the optical disc 1 records data on or reproduces data from the optical disc 1.

Figure 4:
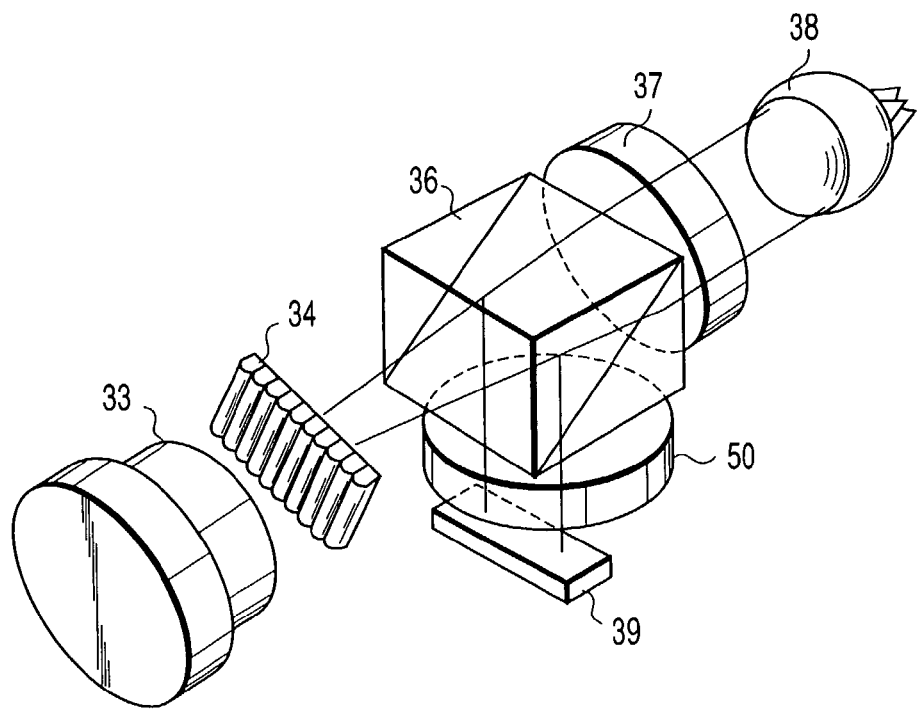
FIG. 4 shows a perspective view of an optical head of the optical recording and reproducing apparatus of FIG. 3.

The optical head 32 comprises a laser diode (LD) 33 as a light source, a diffraction grating 34 which diffracts a laser beam in three light beams 101, 102 and 103, a polarized light beam splitter 36 which separates an incident light to the optical disc 1 and a reflected light from the optical disc 1, a ¼ wavelength plate 37 that changes the polarization of the light beam passed through the polarization light beam splitter 36, and an objective lens 38 that focuses the light beam to form a minute light beam spot on the optical disc 1, a condenser lens 50 that condenses the light reflected from the optical disc 1 and led by the beam splitter 36, and a photodetector unit 39 which receives focused beams, as shown in FIGS. 3 and 4.

An optical lens actuator 4 moves the objective lens 38 to an optical axis direction (a focusing direction) and a tracking direction according to a focusing error and a tracking error. A diffraction grating actuator 41 rotates the diffraction grating 34 according to the tracks 111, 112 and 113.

The photodetector unit 39 comprises three multiple-photodetectors, for example, three quadrant-photodetectors each having four detection regions. The three quadrant-photodetectors are provided for three light beams, respectively. A plurality of output signals output from the photodetector 39 are input to an analog operation circuit 42. The analog operation circuit 42 generates a reproduced signal corresponding to data recorded on the optical disc 1, and focusing error signals and tracking error signals corresponding to three light beams. The focusing error signal and tracking error signal are selected by a switching circuit 45 configured to switch the focusing error to the tracking error signal or vice versa.

The focusing error signal and tracking error signal are input to a lens servo circuit 43. The lens servo circuit 43 controls the lens actuator 4 so that the objective lens 38 is adjusted in a focusing direction and a tracking direction. A diffraction grating servo circuit 44 controls the diffraction grating actuator 41 according to a signal indicating a beam distance deviation that is output from the reproduced data processor 48, and drives the diffraction grating 34 so that three light beams trace the tracks 111, 112 and 113 as shown in FIG. 2.

The laser diode driver 46 drives the laser diode 33 according to the recording data from the recording data processor 47. The reproduced data processor 48 processes the reproduced signal from the arithmetic circuit 42 to generate a reproduced output signal.

The tracking error signals are described hereinafter. The tracking error signals 221, 222 and 223 are generated by three light beams 101, 102 and 103 using a push-pull method, for example. When the tracking error signals 221, 222 and 223 are input to the switching circuit 45, one of the tracking error signals 221, 222 and 223 is selected by a track discrimination signal 24 corresponding to three tracks 111, 112 and 113. In other words, when data is recorded on or reproduced from the track 111, the switching circuit 45 selects the tracking error signal 221 and supplies it to the lens servo circuit 43 as a tracking control signal 23. In case of recording or reproducing of the track 112 or 113, the switching circuit 45 selects the tracking error signal 222 or 223 and outputs the tracking control signal 23.

The second embodiment will be described referring to FIGS. 6A and 6B hereinafter. The second embodiment can apply to the groove recording scheme, land recording scheme, and land & groove recording scheme similarly to the first embodiment. In this second embodiment, two tracks are provided on the groove of the land & groove recording scheme.

Figures 6A, 6B:
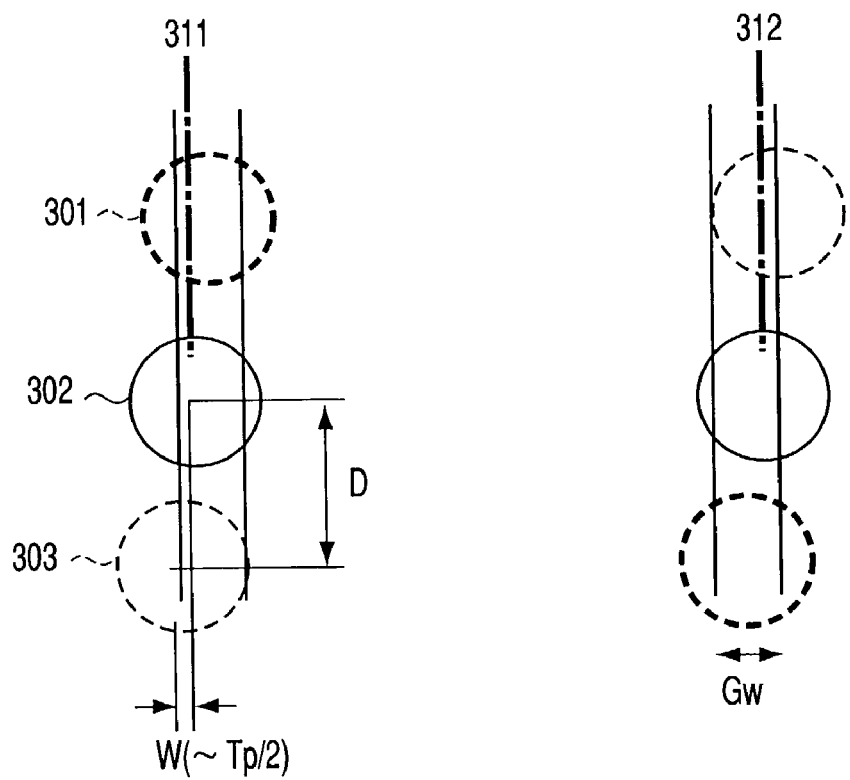
FIGS. 6A and 6B show positional relations between a focused beam and two tracks provided in a groove or a land.

FIGS. 6A and 6B each show a relative positional relation between the track to be recorded or reproduced and three beams in a case of providing two tracks on the groove of the land & groove recording scheme. In FIGS. 6A and 6B, two tracks 311 and 312 are provided on the groove as shown by a dash-and-dot line in FIGS. 6A and 6B In other words, FIG. 6A shows a state that data is recorded on or reproduced from the track 311 on the left side (the circumference side of the optical disc) with respect to the groove center. FIG. 6B shows a case that data is recorded on or reproduced from the track 312 on the right side (the internal circumference side of the optical disc) with respect to the groove center. Diffracting the laser beam from the laser diode 33 by means of the diffraction grating 34 generates three light beams 31, 32 and 33 condensed on the groove. The ratio between the light intensities of the side light beams 31 and 33 shown by dashed lines and the light intensity of the central light beam 32 shown by the solid line is set to 1:1, and the recording and reproducing of data are performed by the central light beam 32 of the high light intensity.

By setting the light intensity ratio between the light beams to 1:1, it is avoided that the side light beams 31 and 33 erroneously erase data recorded on adjacent tracks, in the recording operation.

Further, the beam diameter $\Phi$ corresponding to $1/e^2$ of the center light intensity of each focal beam has a relation of Gw to $2\Phi/3$ with respect to the groove width Gw. This means to provide a good tracking error signal with a large amplitude. Therefore, a stable tracking control can be realized.

A point different from the first embodiment is the distance W between the center position of each of three light beams 101, 102 and 103 and the track with respect to a vertical direction. The distance W makes ½ of the track pitch Tp between the tracks 311 and 312 substantially coincide. Further, the distance D between the center positions of three light beam 31, 32 and 33 with respect to a direction along the track is set to $D \geq 2\Phi$ with respect to the focused beam diameter $\Phi$.

Figure 7:
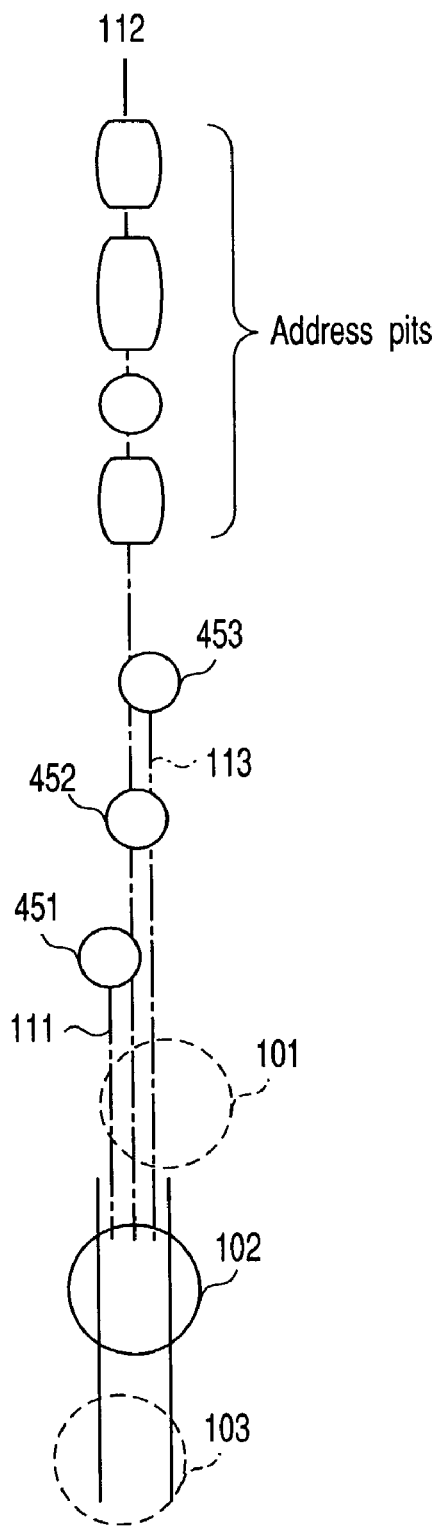
FIG. 7 shows a pit arrangement for detecting distances among three tracks.

In the second embodiment, when data is recorded on or reproduced from the track 311 as shown in FIG. 6A, the tracking control is performed using the light beam 31 shown by a thick dashed line in FIG. 6A, and the recording or reproducing of data is performed using the central light beam 32. When data is recorded on or reproduced from the track 312 as shown in FIG. 6B, the tracking control is performed using the light beam 33 shown by a thick dashed line in FIG. 6B, and the recording and reproducing of data are performed using the central light beam 32. It is possible to form two tracks on the groove using the conventional tracking control driver by changing two kinds of light beams to generate a tracking error signal as described above. In addition, the focusing error signal may be generated using the light beam used for the tracking control or the central light beam in either of FIGS. 6A and 6B. In a case of forming four or more data tracks on the same groove or land, it is obvious that the formation of odd-numbered tracks may expand the first embodiment of FIG. 2, and the formation of even-numbered tracks may expand the second embodiment of FIG. 6. FIG. 7 shows a track format providing pits for detecting each track distance of the first embodiment on a header portion on which addresses or sector numbers of the tracks are recorded by pits. The track distance detection pits 451, 452 and 453 are preformed in correspondence with the track centers of the tracks 111, 112 and 113.

Further, the address pits of a groove or land on which three tracks are formed are formed consistent with the center of the track distance detection pit 452 of the track 112. The three light beams 101, 102 and 103 detect the reproduced signal corresponding to the track distance detection pit. If the distance between the center positions of the light beams in a direction perpendicular to the track is adjusted so that the reproduced signal amplitudes corresponding to two of three light beams become the same, the recording/reproducing apparatus of the present embodiment can deal with the track distance every disc and improve reliability of a recording/reproducing operation. As a method of adjusting the distance between the center positions of the light beams in the direction perpendicular to the track, there is a method of spinning the diffraction grating which generates, for example, a plurality of beams.

Figure 8:
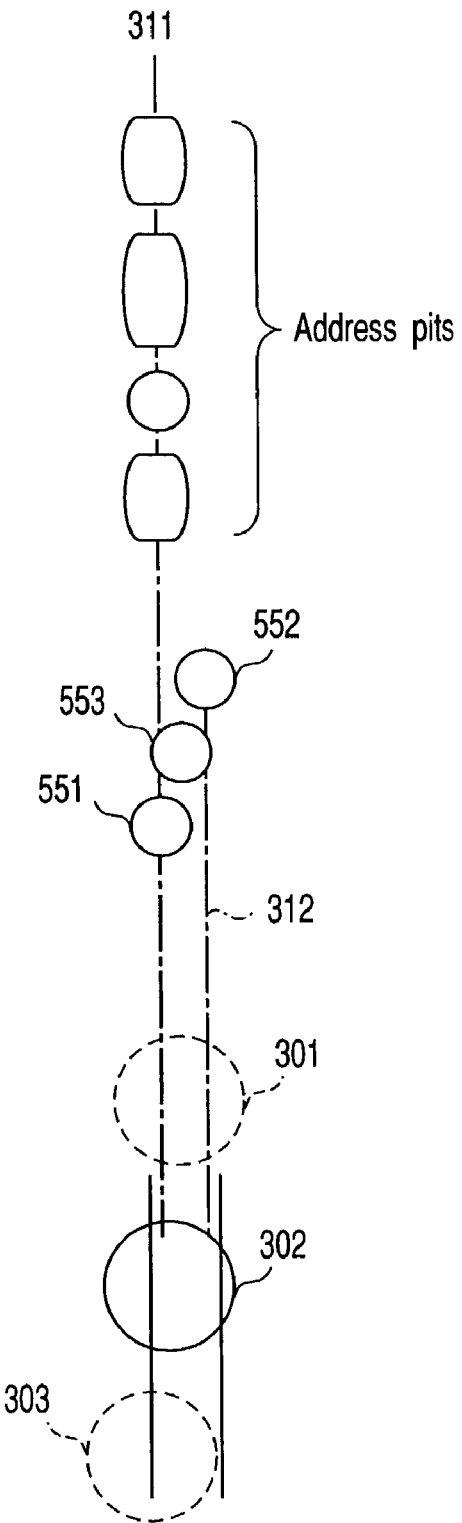
FIG. 8 shows a pit arrangement for detecting a distance between two tracks.

FIG. 8 shows an arrangement of pits to detect each track distance according to the second embodiment. In this time, track distance detection pits 551 and 552 are preformed corresponding to the track distance of the tracks 311 and 312. Further, a pit 553 is formed between the track 311 and 312. The diffraction grating is rotated so that the amplitudes of the reproduced signals of the pits 553 and 551 that are reproduced by two light beams 31 and 32 of three light beams 31, 32 and 33 are coincide with each other. The address pits of a groove or land containing two tracks are formed consistent with the center of the track distance detection pit 551 of the track 311. However, the address pits may be formed on the center of the groove or land that is between the tracks 311 and 312. Furthermore, FIGS. 7 and 8 show the embodiment wherein the track distance detection pits are arranged on the disc every header. It is possible to adjust the vertical distance of the track at the center position of the light beam by preforming the track distance detection pits on a part of the disc such as the most internal circumferential portion or the most outer circumferential portion of the track, and reproducing the track distance detection pits after inserting a disc into a drive apparatus or in an idle-time of the recording/reproducing operation.

As described above, according to the present invention, a stable tracking control can be realized in the optical disc of high track density. As a result, it is possible to provide an optical data recording/reproducing apparatus with high data reliability and high recording density.

Additional advantages and modifications will readily occur to those skilled in the art Therefore, the invention in its broader aspects is not limited to the specific details and representative embodiments shown and described herein Accordingly, various modifications may be made without departing from the spirit or scope of the general inventive concept as defined by the appended claims and their equivalents.

What is claimed is:

1. An optical recording/reproducing apparatus using a recording medium having at least one of a land and a groove, the optical recording/reproducing apparatus comprising:
 a light beam emitting unit configured to emit a plurality of light beams to the recording medium, at least one of the land and groove containing a plurality of tracks corresponding to the light beams;
 a photodetection unit configured to detect the light beams reflected from the recording medium and output detection signals corresponding to the light beams reflected;
 a detection signal selection unit configured to select at least one detection signal of the detection signals detected by the photodetection unit according to on or from which of the plurality of tracks data is recorded or reproduced; and a tracking control unit configured to make one of the light beams trace the track to be recoded or reproduced, according to the detection signal selected, wherein a pitch Tp between the tracks is defined by Tp<2Φ/3 where Φ indicates a diameter of each of the light beams, a distance W between center positions of adjacent ones of the light beams in a direction perpendicular to the track is set to the pitch Tp or Tp/2, a distance D between the center positions of the light beams adjacent in a direction along the track is set to D≧2Φ.

2. An optical data recording/reproducing apparatus according to claim 1, wherein the recording medium includes a plurality of pits preformed consistent with centers of the tracks, and which includes an adjusting unit configured to adjust a distance between the center positions of the light beams with respect to a direction perpendicular to the track.

3. An optical data recording/reproducing apparatus according to claim 1, wherein a light intensity of the one of the light beams is set to a value larger than a light intensity of another of the light beams.

4. An optical data recording/reproducing apparatus according to claim 3, wherein the recording medium includes a plurality of pits preformed consistent with centers of the tracks, and which includes an adjusting unit configured to adjust a distance between the center positions of the light beams with respect to a direction perpendicular to the track.

5. An optical data recording/reproducing apparatus according to claim 1, wherein the recording medium includes a plurality of pits preformed consistent with the centers of the tracks, and which includes an adjusting unit configured to adjust the distance between the center positions of the light beams with respect to a direction perpendicular to the track.

6. An optical data recording/reproducing apparatus according to claim 1, wherein the light beam irradiation unit includes a laser generation unit configured to generate a laser beam, and a diffraction grating which diffracts the laser beam to generate the light beams.

7. An optical recording/reproducing method, comprising:

emitting a plurality of light beams to a recording medium, including at least one of a land and groove having a plurality of tracks corresponding to the light beams;

detecting the light beams reflected from the recording medium by a photodetector to output detection signals corresponding to the light beams reflected;

selecting at least one detection signal of the detection signals detected by the photodetector according to on or from which of the plurality of tracks data is recorded or reproduced; and tracking the track to be recoded or reproduced by means of one of the light beams according to the detection signal selected, wherein a pitch Tp between the tracks is defined by Tp<2Φ/3 where Φ indicates a diameter of each of the light beams, a distance W between center positions of adjacent ones of the light beams in a direction perpendicular to the track is set to the pitch Tp or Tp/2, a distance D between the center positions of the light beams adjacent in a direction along the track is set to D≧2Φ.

8. An optical data recording/reproducing method according to claim 7, wherein the recording medium includes a plurality of pits preformed consistent with centers of the tracks, and which includes adjusting a distance between the center positions of the light beams with respect to a direction perpendicular to the track.

9. An optical data recording/reproducing method according to claim 7, wherein a light intensity of the one of the light beams is set to a value larger than a light intensity of another of the light beams.

10. An optical data recording/reproducing method according to claim 7, wherein emitting the plurality of light beams includes generating a laser beam, and diffracting the laser beam to generate the light beams.

* * * * *